Dec. 31, 1963     K. R. WILLIAMS ETAL     3,116,170
GASEOUS FUEL CELLS
Filed June 6, 1960

INVENTORS:
KEITH R. WILLIAMS
DEREK P. GREGORY
BY: H. D. Birch
THEIR ATTORNEY

3,116,170
GASEOUS FUEL CELLS
Keith R. Williams, Little Sutton, and Derek P. Gregory, Boughton, England, assignors to Shell Oil Company, New York, N.Y., a corporation of Delaware
Filed June 6, 1960, Ser. No. 34,128
Claims priority, application Great Britain June 10, 1959
12 Claims. (Cl. 136—86)

The present invention relates to gaseous fuel cells.

An object of this invention is to provide a gaseous fuel cell having electrodes of improved performance.

According to the present invention, a gaseous fuel cell has porous electrodes formed by applying a conductive material on a porous non-conductive substrate having an average pore diameter of from ¼ to 25 microns, preferably 1 to 5 microns, the thickness of the conductive material being not greater than twice the average pore diameter of the substrate and not less than 0.03 micron. The thickness of the conductive material is preferably not greater than the average pore diameter of the substrate and is not less than 0.25 micron.

In this specification, the terms "conductive" and "non-conductive" mean electrically conductive and non-conductive, respectively.

In order that the invention may be clearly understood and readily carried into effect, several examples of fuel cells according to the present invention will now be described with reference to the accompanying drawing in which.

Figure 1:
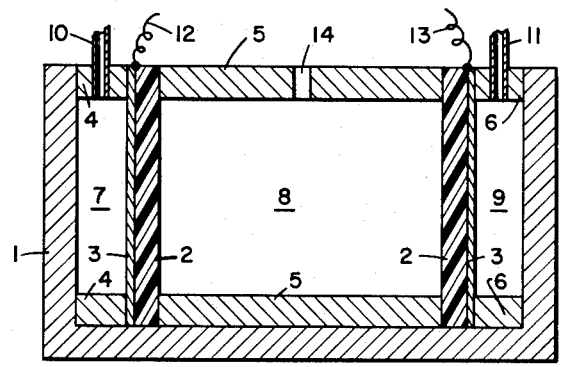
FIG. 1 is a vertical central section of a cell on a plane at right angles to the face of the electrodes.

Referring to FIG. 1 of the accompanying drawing, the cell has an outer casing of 1 of non-conductive impermeable material and a pair of electrodes formed of a porous non-conductive substrate 2 and a porous conductive surface 3. The electrodes are maintained in the casing 1 in close contact with its walls and are held in position by spacers 4, 5 and 6 to provide a fuel space 7, an electrolyte space 8 and an oxidant space 9, respectively. The upper spacers 4 and 6 are provided with conduits 10 and 11 for the connection of spaces 7 and 9 to a fuel and oxidant gas supply, respectively. Outlet pipes (not shown) are also connected to the upper spacers 4 and 6 for the venting of the gases. Leads 12 and 13 connected to the electrodes are used to supply electrical current to the apparatus being operated by the cell.

In operation, the electrolyte space 8 is filled through aperture 14 with a suitable electrolyte, a fuel gas is supplied through conduit 10 to the space 7 and an oxidant gas is supplied through conduit 11 to the space 9. The gaseous fuel used in the cells of the present invention is preferably hydrogen, but other gaseous fuels such as methane, ethane, or carbon monoxide may be used, particularly at elevated temperatures.

Figure 2:
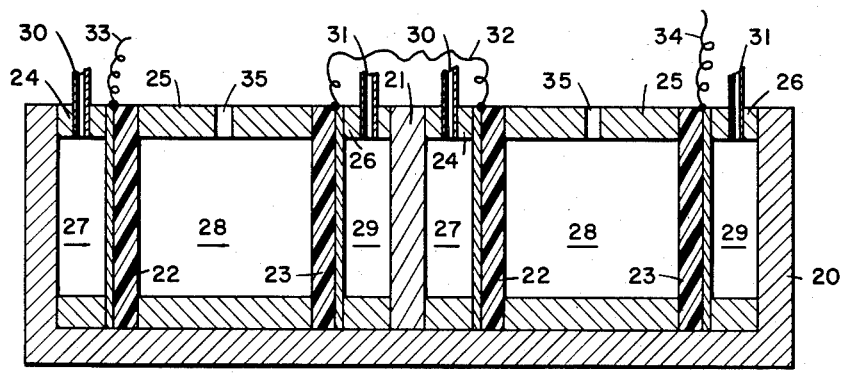
FIG. 2 is a similar view to FIG. 1 showing two cells joined in series.

A number of cells may be connected in series to form a battery as shown, for example, in FIG. 2, where an outer casing 20 is divided along its length by an impermeable wall 21 to form two cells. Each cell contains two electrodes 22 and 23 of the above type and these are held in position by spacers 24, 25 and 26 to form the fuel gas space 27, the electrolyte space 28 and the oxidant gas space 29, respectively. The upper spacers 24 and 26 are provided with conduits 30 and 31 to connect the spaces 27 and 29 with a fuel and oxidant gas, respectively. Outlet pipes (not shown) are also connected to the upper spacers 24 and 26 for the removal of the gases from the spaces 27 and 29.

The electrode 23 of one cell is connected to the electrode 22 of the other cell by lead 32. Lead 33 connected to the electrode 22 of one cell together with lead 34 connected to the electrode 23 of the other cell are used to deliver the electrical current to the apparatus being operated by the battery.

In use the electrolyte spaces 28 are filled through apertures 35 with a suitable electrolyte, a fuel gas is supplied through conduits 30 to the spaces 27 and an oxidant gas is supplied through conduits 31 to spaces 29.

Figure 3:
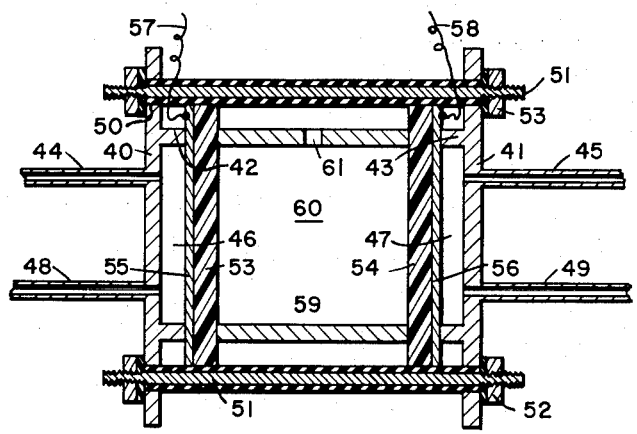
FIG. 3 is a view similar to FIG. 1 but showing an alternative form of cell.

In FIG. 3 is shown an alternative embodiment where the cell has two rectangular stainless steel plates 40 and 41 of about ¼ inch thick, and formed with a continuous projection 42 and 43, respectively. The plates 40 and 41 are provided with gas inlet pipes 44 and 45, leading to gas spaces 46 and 47, and gas outlet pipes 48 and 49. A hole 50 is provided in each corner of the plates 40 and 41 to take bolts 51 which together with nuts 52 clamp the cell together. The bolts 51 and nuts 52 are insulated from the end plates 40 and 41 by insulating sleeves and washers.

The electrodes comprise porous non-conductive substrates 53 and 54 and porous conductive surfaces 55 and 56 in contact with the projections 42 and 43 of the end plates 40 and 41. Leads 57 and 58 connected to the conductive surfaces 55 and 56 of the electrodes are used to deliver electrical current to the apparatus being operated by the cell.

A separator 59 of Perspex (methyl methacrylate) of about ⅛ inch thick is mounted between the substrates 53 and 54 of the electrodes and has its center cut out to form a chamber 60.

In operation, the chamber 60 is filled through aperture 61 with an electrolyte, a gaseous fuel is supplied through pipe 44 to space 46 and an oxidant gas is supplied through pipe 45 to space 47.

A particularly compact cell may be constructed by applying a conductive surface to opposite faces of the same substrate and impregnating the substrate with an electrolyte. The fuel and oxidant gases may be applied in either of the above described ways. Such a cell would be suitable for the building up of a battery of cells in a filter press type of construction.

Any water formed in a cell during the reaction may be removed in a cooler connected to either or both electrodes, and by ensuring that the gases circulate through the cooler. In this way both heat and water formed in the cell are removed.

The electrodes used in the cells of the present invention must be porous so that the conductive surface will both contact the electrolyte and absorb the fuel and oxidant gases employed. The conductive surface may be itself a material which will act as a catalyst for the particular electrode reaction, or it may be coated with such a material. Silver, palladium, platinum, osmium, manganese, copper, nickel, lead and carbon may be used for the conductive material of a hydrogen electrode. The substrate must be unaffected by the electrolyte used in the cell and the material known under the registered trademark "Porvic" a microporous polyvinyl chloride, a microporous polyethylene or polystyrene, sintered glass, porcelain and the like may be used. The pore diameter suitable for the substrate of the present invention may be determined by measuring the pressure necessary to force air through the pores when the substrate is thoroughly wetted by a suitable liquid. This is represented by $$r = 2T/p$$

where $r$ is the pore radius, $p$ is the pressure in dynes/cm.$^2$ and $T$ is the surface tension of the liquid. Suitable liquids for wetting a substrate of polyvinyl chloride are alcohols such as n-propanol or n-butanol. In the case of a sintered glass substrate water may be used.

In the preferred electrode according to the present invention, a microporous substrate of non-electrical conductive material, such as that known under the registered trademark "Porvic," having an average pore diameter of 3 to 4 microns, is coated with a 0.01 to 0.3 micron film of silver by vacuum evaporation. This produces a surface having pores similar to those of the substrate. This film is further thickened with electrodeposited silver and activated by electrodeposition of palladium to produce the final surface, to which a further layer of palladium black not exceeding 0.05 gms./sq. cm. may be applied, the total thickness of the conductive films being 3 to 4 microns. The electrodes are generally in the form of square plates but other shapes such as circular plates may be used.

The electrolyte may be basic or acid, such as potassium hydroxide having a strength of preferably 6 Normal, sulfuric acid having a strength of between 2 to 20 Normal, phosphoric acid, hydrochloric acid or sodium hydroxide. In the above-described cells the electrolyte used is in the liquid form but it is possible to use solid or semi-solid forms of the electrolyte. Thus, the electrolyte can be converted into a jelly form by means of a suitable thickening agent, such as silica gel, or the electrolyte may be absorbed in the substrate. Fused salt electrolytes may be used such as those containing mixtures of alkali carbonates, alkaline earth carbonates and other salts such as alkali halides to lower the melting point.

The gases may be fed to the cell at any convenient pressure varying from one atmosphere to 1000 p.s.i. Efficiency improves with increasing pressure, and a preferred pressure range is 2 to 100 p.s.i. The gas pressure should be 2 to 6 p.s.i. above the pressure on the electrolyte.

The present fuel cells will operate over a wide range of temperatures depending on the fuel and electrolyte used. Thus it will operate at ambient temperature when using hydrogen as the fuel.

The following examples illustrate the present invention:

*Example I*

A cell was constructed as shown in FIG. 3 of the accompanying drawing using electrodes composed of a microporous substrate of the material known under the registered trademark "Porvic" having an average pore diameter of 3 to 4 microns and a conductive material having a thickness of 3 microns. The conductive material was a layer of silver 2.5 microns thick applied to the substrate and followed by layers of palladium and palladium black which together amounted to a thickness of 0.5 micron. The electrolyte was potassium hydroxide having a strength of 6 Normal.

When this cell was operated at 25° C. it produced an output of 25 amps./sq. ft. at 0.5 volt. Operating at 70° C., this cell had an output of 75 amps./sq. ft. at 0.5 volt.

*Example II*

This cell differed only from the cell used in Example I in that the electrodes had a layer of palladium black 0.5 micron thick applied direct to the silver and the palladium was omitted, the layer of palladium black was 0.005 gram per sq. cm.

Operating at 21° C. this cell had an output of 20 amps./sq. ft. at 0.5 volt.

*Example III*

This cell was similar to that used in Example II but air was used instead of oxygen as the oxidant.

Operating at 21° C. this cell had an output of 20 amps./sq. ft. at 0.5 volt.

We claim as our invention:

1. A method for producing a fuel cell electrode which comprises depositing by evaporation a conductive layer of silver on a plate of non-conductive polyvinyl chloride having pores of ¼ to 25 microns average diameter, electrodepositing silver onto said layer until its thickness is not less than 0.03 micron nor greater than twice the average pore diameter of said polyvinyl chloride plate and applying to the silver surface palladium black catalyst in an amount not exceeding 0.05 gram per sq. cm.

2. An electrode suitable for use in a gaseous fuel cell comprising a plate of porous non-conductive polyvinyl chloride having pores of ¼ to 25 microns average diameter, one face of said plate having a layer of silver deposited thereon via evaporation of the metal onto the surface followed by electrodeposition of silver until the thickness of the silver layer is not less than 0.03 micron nor greater than twice the average pore diameter of the polyvinyl chloride plate, there being palladium black catalyst in an amount not exceeding 0.05 gram per sq. cm. on the silver.

3. A method for producing a fuel cell electrode which comprises depositing via vacuum evaporation a conductive layer of silver on a plate of microporous non-conductive polyethylene having pores of ¼ to 25 microns average diameter, building up said silver layer to a thickness not less than 0.03 micron nor greater than twice the average pore diameter of the polyethylene, said silver having pores similar to those of said polyethylene which pores communicate with the pores on the opposite face of the polyethylene plate and applying palladium black catalyst on said silver.

4. An electrode suitable for use in a gaseous fuel cell comprising a plate of porous non-conductive microporous polymer having pores of ¼ to 25 microns average diameter, one face of said plate having a layer of silver thereon deposited initially by evaporation of the metal onto the surface and built up by electrodeposition to a thickness not less than 0.03 micron nor greater than twice the average pore diameter of the microporous polymer, said silver having pores similar to those of said microporous polymer which pores communicate with the pores on the opposite face of the microporous polymer plate and palladium black catalyst on said silver in an amount not exceeding 0.05 gram per sq. cm.

5. A method for producing a fuel cell electrode which comprises evaporating onto a microporous non-conductive polyvinyl chloride substrate having pores of ¼ to 25 microns average diameter, a coherent layer of silver metal, building up said silver layer by electrodeposition of metal to a thickness not less than 0.25 micron nor greater than the average pore diameter of the polyvinyl chloride substrate, and applying on the metal layer a palladium black catalyst for gaseous fuel cell reaction.

6. An electrode suitable for use in a gaseous fuel cell comprising a microporous non-conductive polyvinyl chloride substrate having pores of ¼ to 25 microns average diameter, a layer of porous conductive metal applied thereto by evaporation of the metal onto the substrate followed by electrodeposition, the thickness of said layer being not less than 0.25 micron nor greater than the average pore diameter of the polyvinyl substrate and a catalyst for gaseous fuel cell reaction applied to said metal layer in an amount not exceeding about 0.05 gram per sq. cm. of surface.

7. An electrode suitable for use in a gaseous fuel cell comprising a microporous non-conductive polymer having pores of ¼ to 25 microns average diameter, a layer of porous conductive metal applied thereto be evaporation of the metal onto the substrate followed by electrodeposition, the thickness of said layer being not less than 0.25 micron nor greater than the average pore diameter of the microporous polymer and palladium block in an amount not exceeding about 0.05 gram per sq. cm. on said metal layer.

8. A method for producing a fuel cell electrode which comprises evaporating onto a microporous non-conductive polymer having pores of ¼ to 25 microns average diameter, a layer of metal, building up the thickness of the metal layer by electrodeposition of metal to a total thickness not less than 0.03 micron nor greater than twice the average pore diameter of the microporous polymer and applying to metal layer catalyst for gaseous fuel cell reaction.

9. An electrode suitable for use in a gaseous fuel cell comprising a microporous non-conductive polyvinyl chloride substrate having pores of ¼ to 25 microns average diameter, a layer of porous conductive metal applied thereto by evaporation of the metal onto the substrate followed by electrodeposition, the thickness of said layer being not less than 0.03 micron nor greater than twice the average pore diameter of the substrate and a catalyst for gaseous fuel cell reaction applied to said metal layer in an amount not exceeding about 0.05 gram per sq. cm. of surface 10. An electrode suitable for use in a gaseous fuel cell comprising a microporous non-conductive substrate having pores of ¼ to 25 microns average diameter, a layer of porous conductive metal applied thereto by evaporation of the metal onto the substrate and building up the metal layer to a thickness not less than 0.03 micron nor greater than twice the average pore diameter of the substrate so that the metal layer has pores similar to those of the substrate which pores communicate with the pores on the opposite side of the substrate and a catalyst for gaseous fuel cell reaction on said metal layer.

11. A gaseous fuel cell having porous electrodes formed by applying a layer of conductive metal by evaporation onto a microporous non-conductive substrate having an average pore diameter of from ¼ to 25 microns and electrodepositing further metal onto said layer to make the total thickness thereof at least 0.03 micron but not greater than twice the average pore diameter of the substrate, said microporous non-conductive substrate being in contact with a liquid electrolyte, one electrode being in contact with a gaseous fuel and one electrode being in contact with oxygen-containing gas.

12. A cell according to claim 11 wherein the conductive metal layer deposited on the substrate has pores similar to those of the substrate and provide contact between the electrolyte and said gases, there being conductive material on one face only of the substrate in each electrode.

References Cited in the file of this patent

UNITED STATES PATENTS

| | | |
|---|---|---|
| 409,365 | Mond et al. | Aug. 20, 1889 |
| 2,384,463 | Gunn et al. | Sept. 11, 1945 |
| 2,666,802 | Woodring et al. | Jan. 19, 1954 |
| 2,699,460 | Blake | Jan. 11, 1955 |
| 2,913,511 | Grubb | Nov. 17, 1959 |
| 2,914,595 | Darland | Nov. 24, 1959 |
| 2,947,797 | Justi et al. | Aug. 2, 1960 |
| 2,980,749 | Broers | Apr. 18, 1961 |